United States Patent

[11] 3,593,504

| [72] | Inventors | Karl-Heinz Konig;<br>Antonius Huntrup, both of Essen, Germany |
|---|---|---|
| [21] | Appl. No. | 795,168 |
| [22] | Filed | Jan. 30, 1969 |
| [45] | Patented | July 20, 1971 |
| [73] | Assignee | Landmaschinenfabrik Essen G.m.b.H<br>Essen, Germany |
| [32] | Priority | Jan. 31, 1968, Feb. 2, 1968 |
| [33] | | Germany |
| [31] | | P 16 32 812.4 and P 16 32 813.5 |

[54] FREE-CUTTING MOWING MACHINE
8 Claims, 9 Drawing Figs.

[52] U.S. Cl. .................................................. 56/6, 56/25.4
[51] Int. Cl. ........................................... A01d 35/26
[50] Field of Search ........................................ 56/6, 25, 25.4

[56] References Cited
UNITED STATES PATENTS
| 3,323,294 | 6/1967 | Knepper | 56/25 |
| 3,389,540 | 6/1968 | Zweegers | 56/25.4 |
| 3,449,893 | 6/1969 | Hurlburt | 56/25 |
| 3,462,926 | 8/1969 | Webster et al. | 56/25.4 |

FOREIGN PATENTS
| 6,500,370 | 7/1966 | Netherlands | 56/6 |

*Primary Examiner*—F. Barry Shay
*Assistant Examiner*—J. A. Oliff
*Attorney*—Ernest G. Montague ABSTRACT: A free-cutting mowing machine especially a mowing machine comprising a main frame and a trailing beam pivotally carried on one end thereof on the main frame. A mowing beam is pivotally connected to the other end of the trailing beam and cutting discs rotate about vertical axes and are carried by the mowing beam. A first spring operatively connects the mowing beam with the trailing beam and a second spring operatively connects the mowing beam with the main frame. A tensioning device connects in its operative length to the mowing beam and to the main frame via the trailing beam such that the load of the mowing beam is equalized in a transporting position at least partly for the purpose of an easy, high raising.

FREE-CUTTING MOWING MACHINE

The present invention relates to a mowing machine adapted to be applied for agricultural purposes, and particularly to a free-cutting mowing machine having cutter discs which are mounted for rotation about a round vertical axle of a cutter bearing unit arranged transversely to the operating direction, with each of the cutter discs projecting into the adjacent range of operation.

It is one object of the present invention to provide a free-cutting mowing machine which provides for a most simple way of attachment and operation of the mowing machine at the backward part of vehicles, as tractors or the like. Known mowing machines of this type show the disadvantage of being comparatively heavy due to the fact that the drive of the cutter discs is mounted within the mowing beam thus complicating both the attachment of the mowing machine to the vehicle and the adjustment of the mowing beams with regard to the required operating and transportation position. Hitherto the attachment of the mowing machine required additional lifting means which increase the number of technical means and complicate its operation. The present invention overcomes these disadvantages by providing an integrally stiff supporting frame adapted to attach the mowing machine to the backward part of the tractor with the frame having journal bearings for the attachment of the usual upper and lower links of the tractor, on which a so-called trailing beam arranged transversely to the axis of the vehicle is pivotally mounted to be raised or lowered and on the end of the trailing beam there is a bearing for the mowing beam which is pivotally mounted to occupy a raised or lowered position with the supporting frame being coupled by means of belt and pulley means to a catch arranged on the mowing beam and with the weight of the mowing beam including the cutter discs being wholly or partially balanced by means of tension springs.

It is another object of the present invention to provide a free-cutting mowing machine, wherein the supporting frame provides for the whole mowing unit mounted on the upper and lower links of the tractors, which otherwise are used for suspending various agricultural tools, to be readily attached and raised in a high and/or lowered in a low position by means of the hydraulic system of the tractor.

Conveniently the supporting frame is provided with a pivotally mounted adjusting lever to which is connected a tensioning member, for example a wire, chain or the like and which is either manually or automatically adjusted if the mowing beam has for example to be tipped up in a position adapted for transportation. If the adjusting lever, as the present invention also provides, is in the form of a bent and/or double lever, this provides for an automatic adjustment during the operation of the hydraulic system of the tractor and/or during the raising and lowering of the links provided for bearing the supporting frame. On one arm of the lever is attached the tensioning member, whereas the other lever is connected to the mounting means of the tractor with the lengths of the tensioning members and the levers preset to effect an automatic tipping up of the supporting frame when a raising is caused. Conveniently the supporting frame is in the form of an upright isosceles triangle.

It is yet another object of the present invention to provide a free-cutting mowing machine which has the further advantage, that guarding means for the cutter discs are arranged above the mowing beam and that the guarding means essentially is a plate or the like which projects over the cutter discs and is pivotally mounted on the trailing beam and/or supporting frame. This guarding means is further pivotally connected to the mowing beam and/or means for bearing the cutter discs so that a tipping up of the mowing beam in the position ready for transportation effects an automatic tipping up of the guard plate, which thus is arranged close to the cutter discs. Conveniently the guarding means and the links for mounting it are adjustable to provide for an adjustment thereof with regard to the different working conditions.

The embodiment according to the present invention may have alterations with regard to its arrangement. Some of them shown in the accompanying drawings are described with reference to a so-called free-cutting mowing machine which is attached as a "rearward-mounted-mowing machine" to the rearward side of a tractor shown in fragments.

With these and other objects in view which will become apparent in the following detailed description the present invention will be clearly understood in connection with the accompanying drawings, wherein.

Referring now to the drawings, and in particular to FIGS. 1—9, the tractor shown in fragments is represented in the Figures by the letter T. At the back of the tractor are provided in the usual manner two lower links 30 and an upper link 31, which is lengthwise adjustable, with these links allowing to be tipped up and down by a hydraulic system provided on the tractor. This arrangement is generally known and needs no further explanation.

The supporting frame 1 and/or 1' provided for carrying a beam 4 and/or 4' is practically in the form of an upright isosceles triangle and has journal bearings 32, 33 for journal pins 34 of guide links 30 and 31.

Conveniently the frame 1 is in the form of a T, U, O or the like to provide for sufficient stiffness with the lower bars being connected to one another by means of a crossbar 2 and/or 2'. A trailing beam 4 and/or 4' is pivotally mounted on a bearing 3 and/or 3' provided in the frame 1 and/or 1'. The mowing beam and/or unit 6 for carrying the cutter discs is pivotally mounted on the end of the trailing beam 4 and/or 4' with the unit 6 being pivoting both in the upward and the downward direction similar to the trailing beam 4, 4'. The cutter discs 7 bearing the cutters 7a are mounted on the unit 6 to provide for each of the cutters 7a to project into the adjacent range of operation of the next cutters. A socket 8 and a drive 11 at the inner side of the unit 6 are provided for driving the cutter discs 7 and on the outer side of the unit 6 is an outer socket 9.

In the arrangement of the frame according to FIGS. 1 through 4, the trailing beam 4 is provided with a drive 10, which may produce driving power of its own or transmitting driving power from the cardan axle of the tractor. There is shown but one belt pulley of the drive 10 which drives the drive 11 of the associated cutter drive by means of a belt 12. The mowing beam 6 axially pivots around the center of the drive 11 both in an upward and downward direction, the trailing beam 4, with its downward movement being stopped by an abutment 5 which is fixed relative to the crossbar 2 with respect to the required positions.

Directly beside the socket 8 on the upper side of the mowing beam 6 there is provided a bracket or catch 13, the upper end of which is connected to an abutment 15 on the trailing beam 4 by a tension spring 14. On the trailing beam 4 is also provided a bracket 21 having a pivotally mounted lever 22 whose free end is pivotally mounted to the catch 13 by a link 23.

In a support 20 provided at the upper part of the frame 1 is an adjusting lever 18 which can be turned around the axle 19 through 180° and has journal bearings 25 and 26. Attached to the journal bearings 26 there is a tensioning means constituting for example a cable or wire 16 which runs over a roll 17 mounted on the trailing beam 4 with the other end of the wire 16 being fixed to the catch 13 on the mowing beam 6. A tension spring 24 attached to link 23 hinges in the journal bearing 25.

Figure 1:
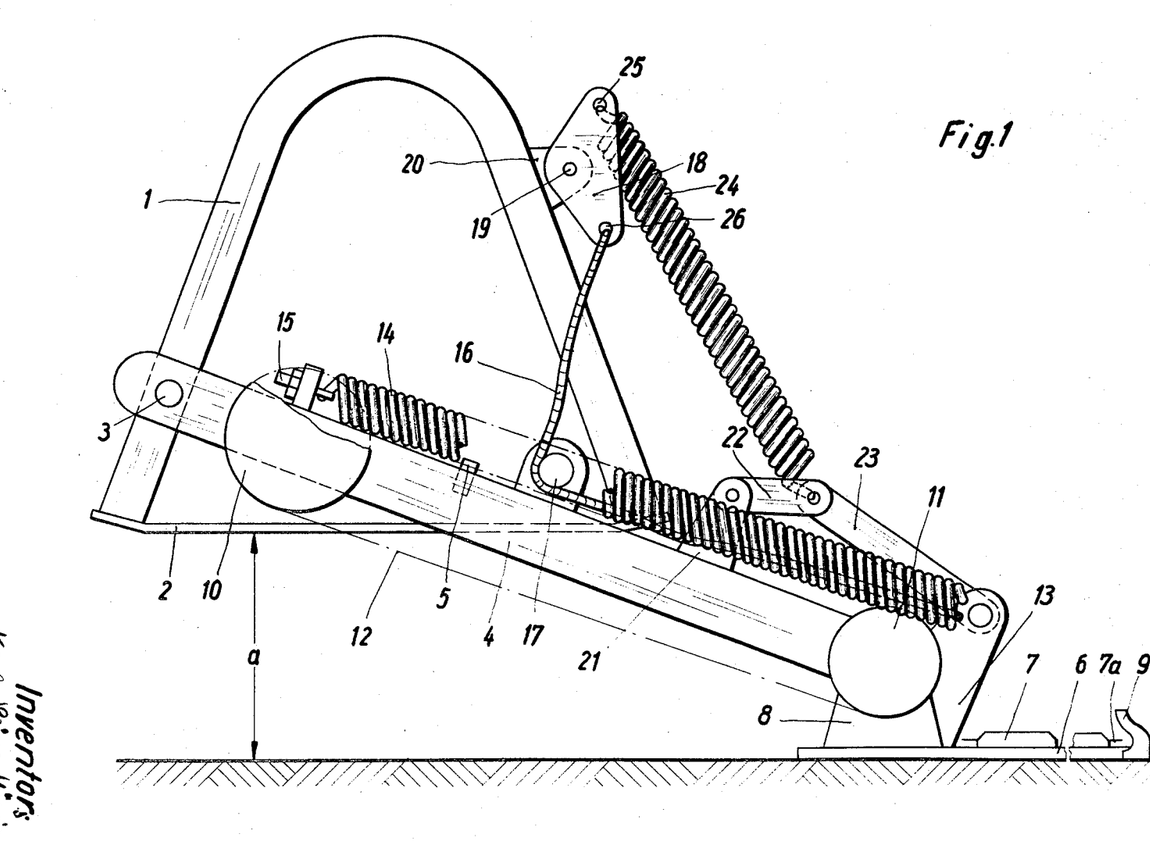
FIG. 1 is an elevation of the mowing machine shown from the rear with the mowing beam being lowered ready for cutting.

In the working position for "Mowing" according to FIG. 1 the hydraulic means of the tractor has been operated to hold the supporting frame 1 at a level a above the ground. The mowing beam 6 engages with the ground and can be pivotally raised or lowered together with the trailing beam 4 for adjusting to the unsymmetrical surface of the ground. The wire 16 for raising the mowing beam is in its released position to affect no stress on the journal bearing 26.

Figure 2:
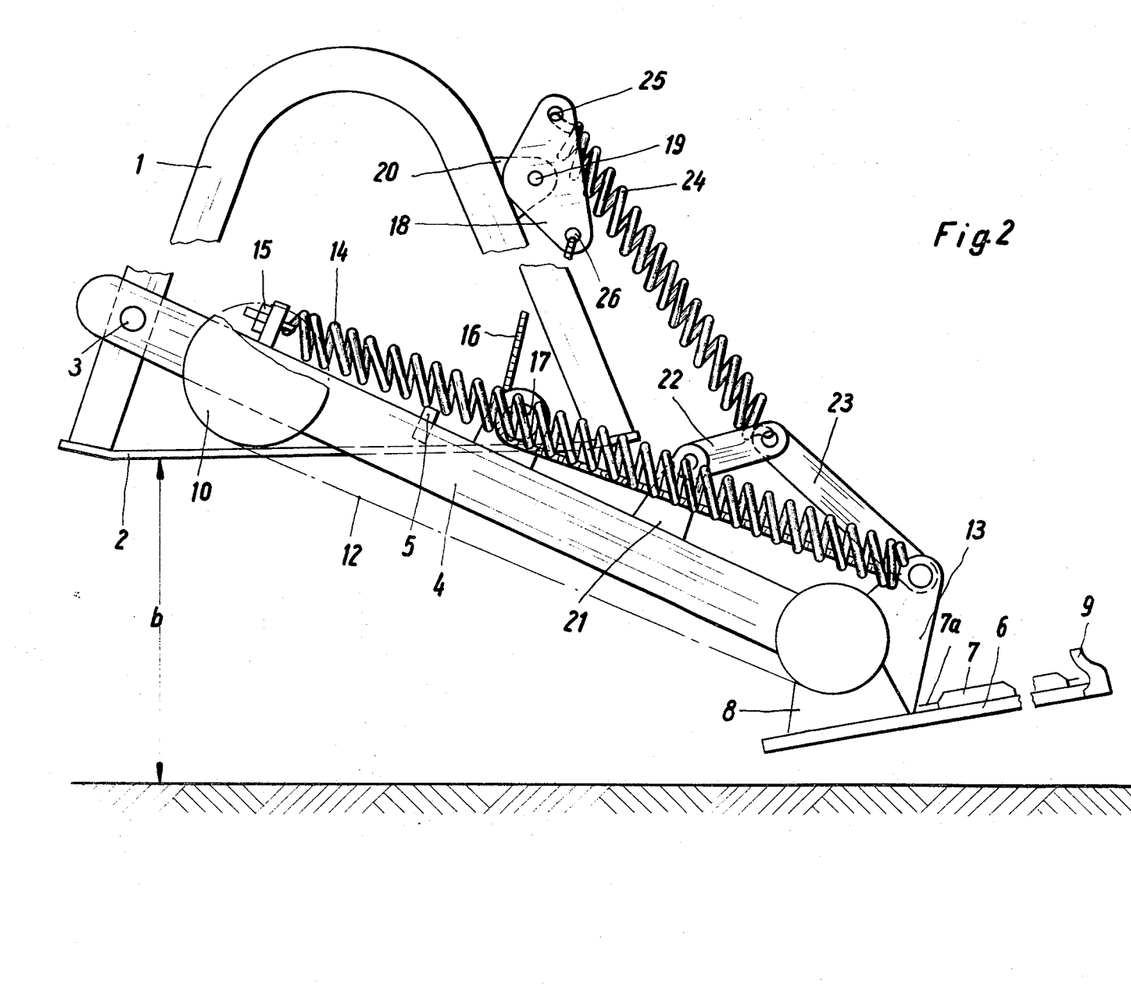
FIG. 2 is an elevation similar to FIG. 1 with the mowing beam being arranged ready for swathing.

In order to provide for the mowing beam 6 to take its so-called swathing position according to FIG. 2, the frame 1 has to be raised somewhat by means of the hydraulic system of the tractor to the height b (FIG. 2). The mowing unit first remains on the ground until the abutment 5 of the trailing beam engages with the crossbar 2 of the supporting frame. The tension springs 14 and 24 and also the wire 16 have been tensioned during this period. The wire which cannot expand now holds the mowing beam 6 in a somewhat raised position, the swathing position.

Figure 3:
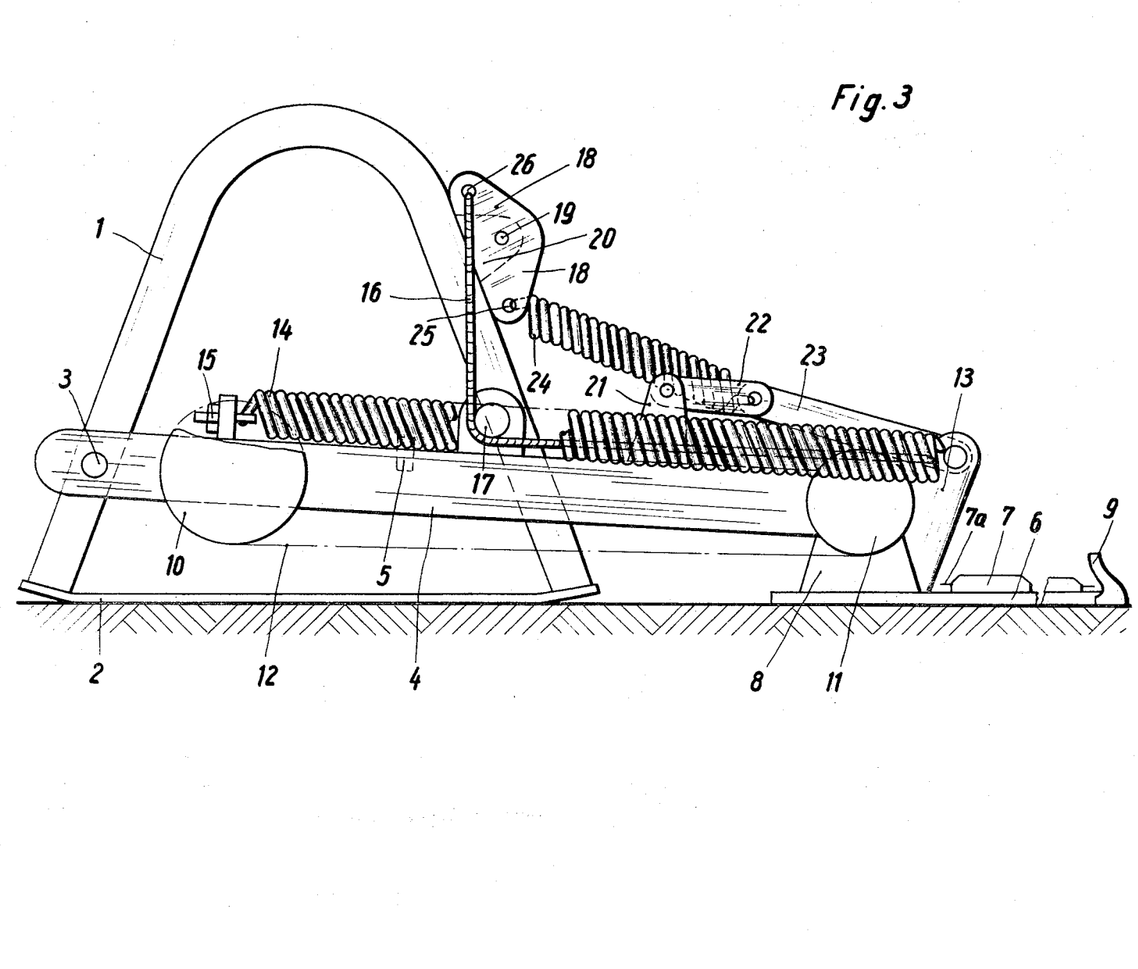
FIG. 3 is a view similar to FIG. 1 with the supporting frame including the mowing machine being completely lowered to the ground.
Figure 4:
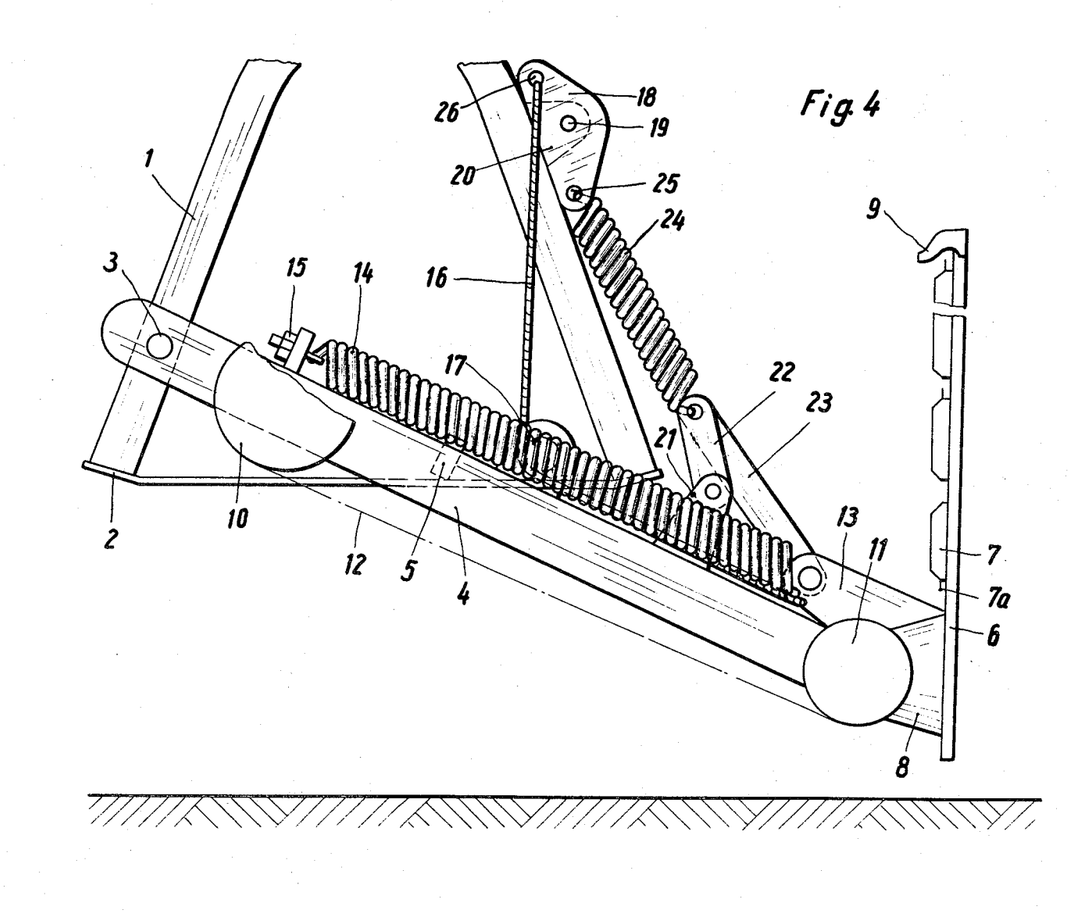
FIG. 4 is a view similar to FIG. 1 with the supporting frame having its highest position and the mowing beam having its tipped up position ready for transportation.

For the purpose of adjusting the mowing unit and the mowing beam in a position adapted for transportation according to FIG. 4, it is necessary for the supporting frame 1 to be lowered onto the ground together with the whole mowing unit by the hydraulic system of the tractor. This position is shown in FIG. 3 with the tension springs 14 and 24 not being tensioned, thus providing for the lever 18 to be readily and manually pivoting through 180°. A repeated raising of the supporting frame 1 effects a new tensioning of the tension springs 14 and 24 and at the same time of the wire 16 thus providing for the mowing beam 6 to be readily and manually tipped up into the vertical position ready for transportation according to FIG. 4. The trailing beam 4 again engages with the abutment 5 on the crossbar 2 of the supporting frame 1.

Figure 5:
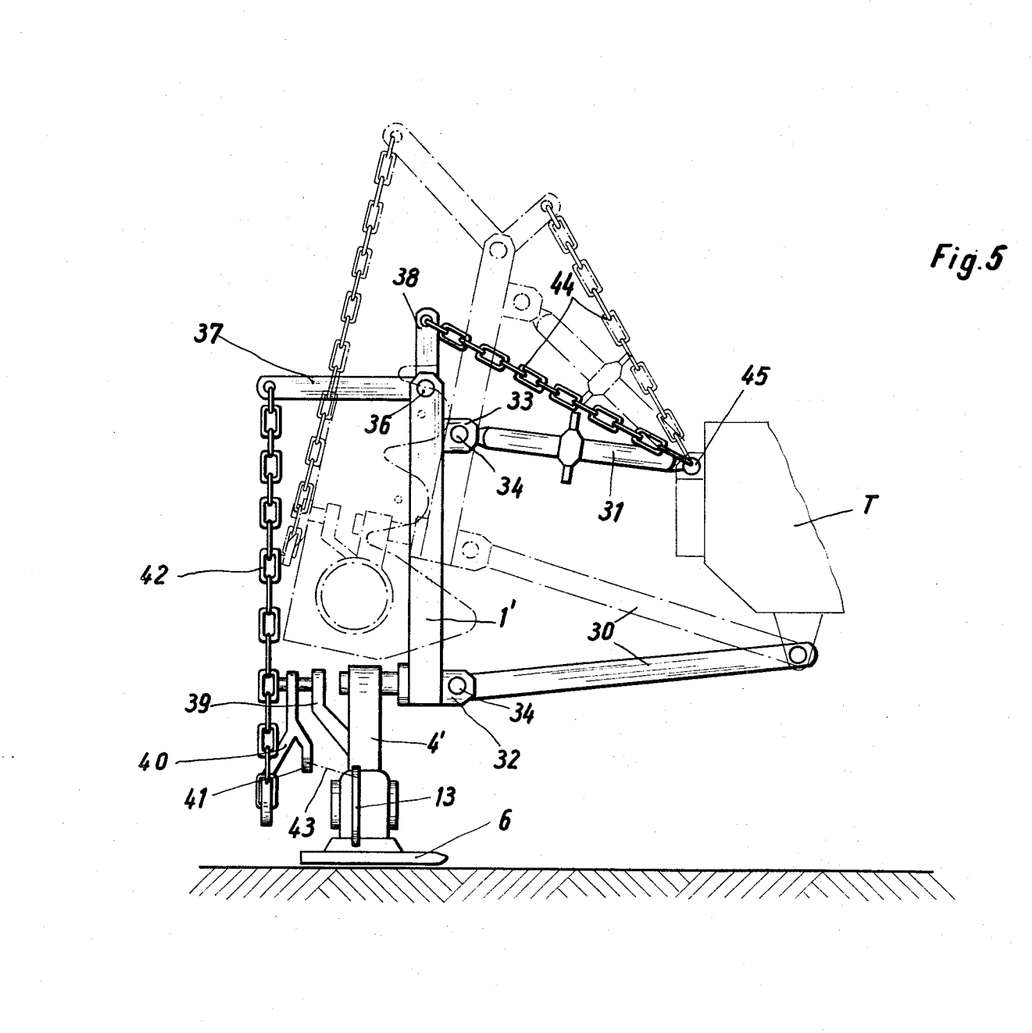
FIG. 5 is a diagrammatical side view of another arrangement of the mowing machine.
Figure 6:
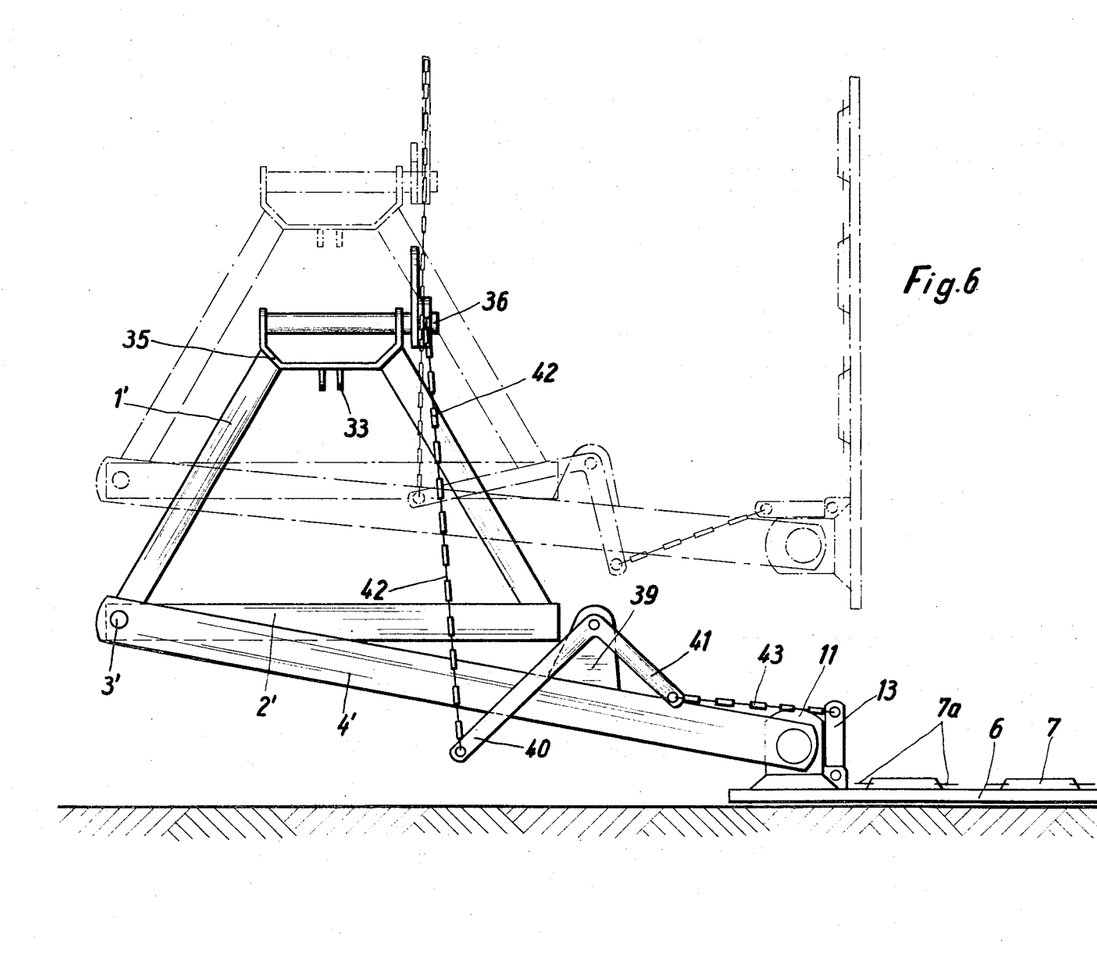
FIG. 6 is a view of the mowing machine of FIG. 5 attached to a tractor, shown from the rear.

For a better representation of the arrangements according to FIGS. 5 and 6 the tension springs for compensating the weight of the mowing beam are not shown. The upper part of the supporting frame 1' provides a journal bearing 35 for a journal point 36 on which is mounted a bent lever 37, 38. On the trailing beam 4' is provided a further bent lever 40, 41 in a bearing support 39. The long ends of the levers 37 and 40 are connected to one another by a chain 42. The arm of the lever 41 is connected to the catch 13 of the mowing beam 6 by a chain 43. A further chain 44 is attached to the short arm of the lever 38. The other end of the chain is mounted at a point 45 of the mounting means of the tractor T.

The broken lines in the FIGS. 5 and 6 illustrate, that the raising and lowering of the supporting frame 1' effects an additional pivoting and/or tipping of the bent levers 37, 38 by means of the tensioned wire and/or chain 44. This motion is transmitted to the mowing beam by the chain 42 and the bent levers 40, 41 as well as by the chain 43 and geared up and/or down in such a manner that the lifting motion of the supporting frame 1' causes an additional motion of the mowing beam 6 which automatically occupies its vertical position and/or the position ready for transportation.

The tension spring means of the supporting frame for compensating the weight of the mowing beam are also provided in this arrangement and facilitate this motion.

Figure 7:
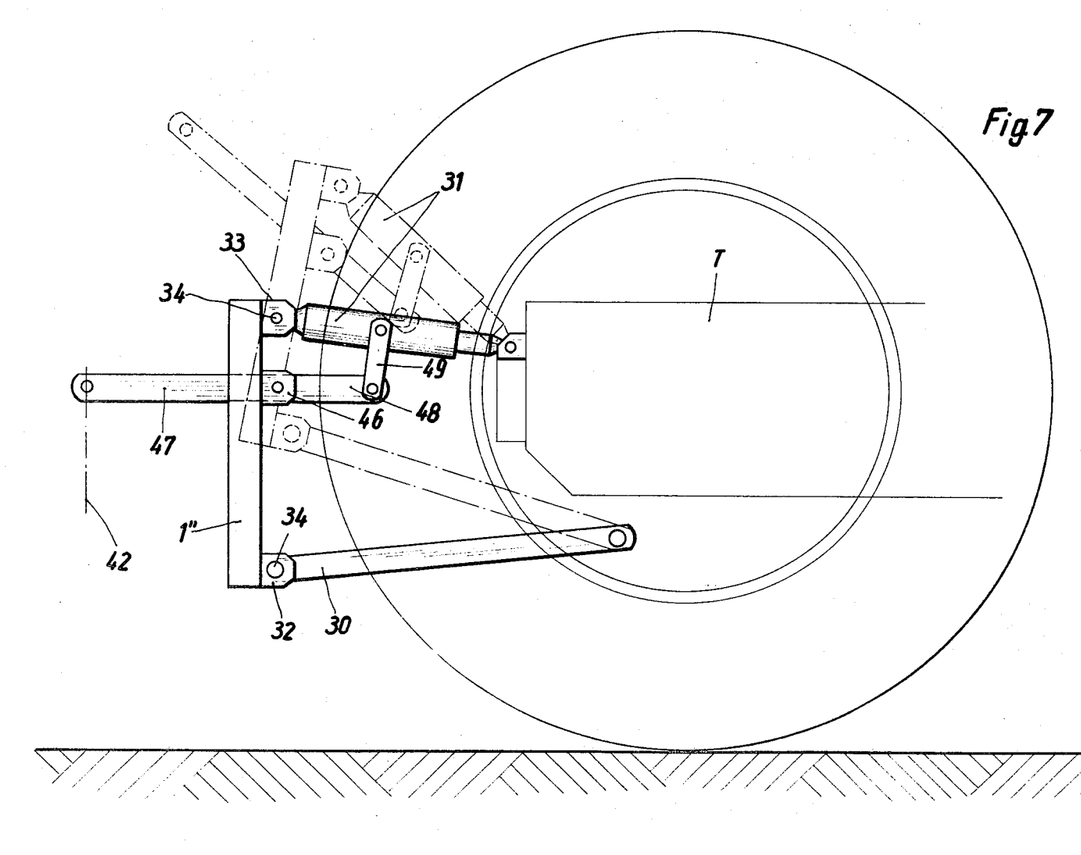
FIG. 7 is a diagrammatical view of another arrangement of the supporting means.

The diagrammatical view of FIG. 7 illustrates another embodiment of the supporting frame 1". Attached to the frame 1" is a double lever 47, 48 pivotally mounted in journal bearings 46. Similar to the arrangement described above the long arm 47 of the lever has mounted on its one end a chain and/or wire 42, whereas the short arm 48 of the lever is pivotally mounted to the endwise adjustable upper link 31. The broken lines of FIG. 7 illustrate that also in this arrangement the raising and lowering of the supporting frame 1" effects an additional motion of the levers 47, 48 thus causing a vertical alignment of the mowing beam.

Figure 8:
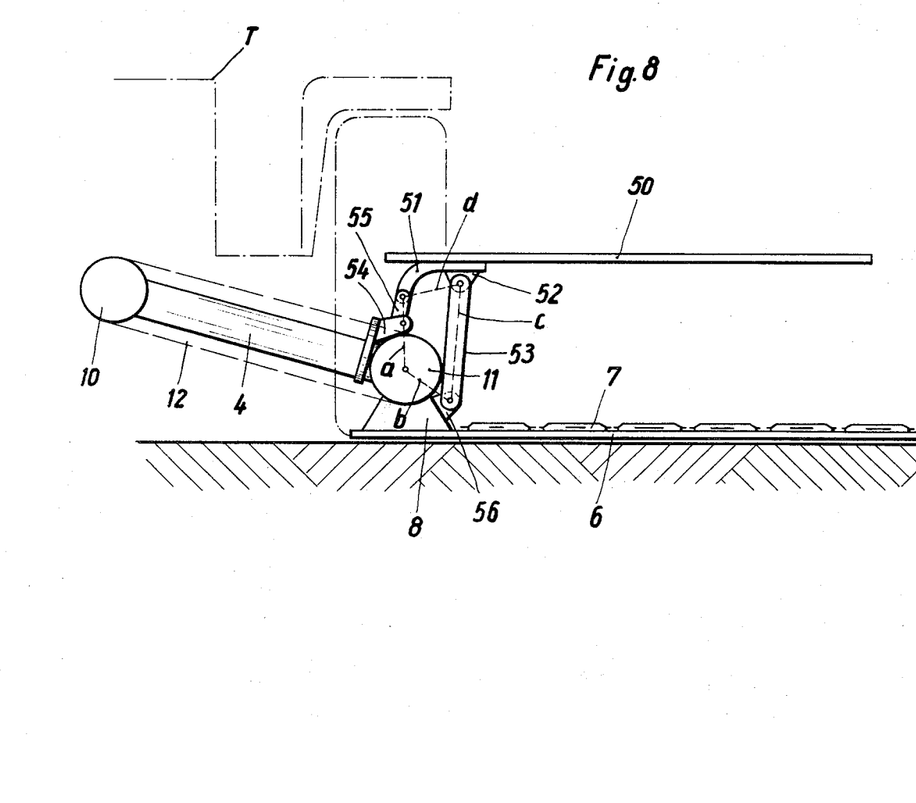
FIG. 8 is a diagrammatical view of the mowing machine with the guarding means being provided on it.
Figure 9:
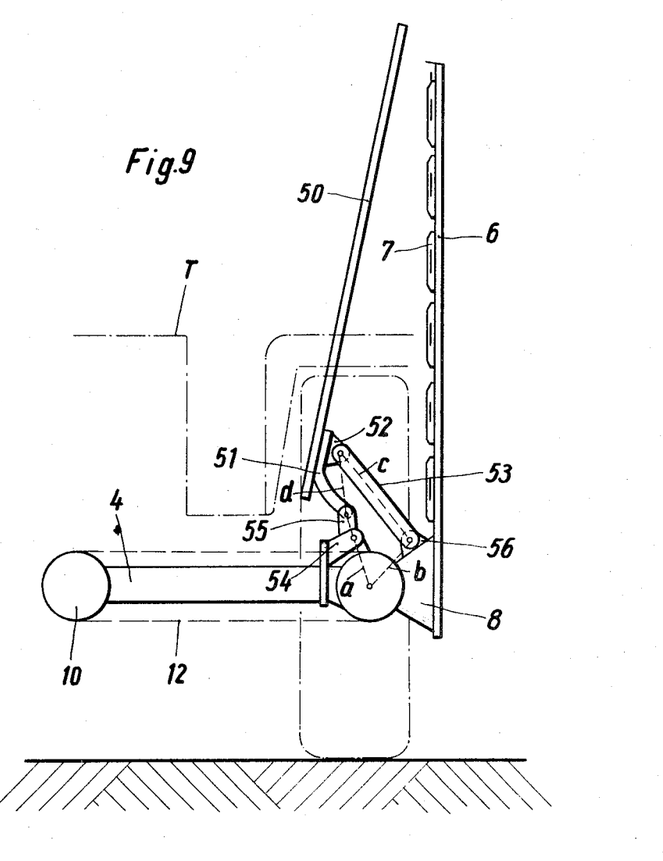
FIG. 9 is a view similar to FIG. 8 with the mowing beam in its tipped up position ready for transportation.

The guarding means in FIGS. 8 and 9 which are particularly adapted to be applied to the free-cutting mowing machine according to the present invention—irrespective of the fact whether they are to be used with rearwardly or laterally mowing units—prevent workers in the field or the driver of the vehicle from being injured by bursting pebbles.

The guarding means essentially comprise a plate 50 which projects at a distance over the cutter discs of the mowing beam 6. At the inner end the plate 50 is provided a bracket 51 and a journal bearing 52. A link 53 pivotally mounted on the bearing 52 connects the plate 50 to the socket 8 by means of a journal bearing 56. The trailing beam is also provided with a bracket 54 which is pivotally mounted to the bracket 51 of the plate 50 by a link 55. The mowing beam 6, the trailing beam 4, the plate 50, and the guiding links 53 form a coupling drive consisting of the members a, b, c. Each of these members is arranged and dimensioned to provide for the guard plate 50 to occupy a position parallel to the mowing beam when the latter is operated (FIG. 8). When the beam 6 has been tipped up (position of transportation), according to FIG. 9, also the guard plate 50 occupies its tipped up position and is slightly inclined to the end of the mowing beam. Every tipping down and/or up of the mowing beam automatically effects a similar motion of the guard plate to its required position.

While we have disclosed several embodiments of the present invention, it is to be understood that these embodiments are given by example only and not in a limiting sense.

We claim:

1. A free-cutting mowing machine, comprising
a main frame,
a trailing beam pivotally carried on one end thereof on said main frame,
a mowing beam pivotally connected to the other end of said trailing beam,
cutting discs rotating about vertical axes and carried by said mowing beam,
a first spring operatively connecting said mowing beam with said trailing beam,
a second spring operatively connecting said mowing beam with said main frame, and
a tensioning means connected in its operative length to said mowing beam and to said main frame via said trailing beam such that the weight of said mowing beam is equalized in a transporting position at least partly for the purpose of any easy, high raising.
2. The mowing machine, as set forth in claim 17, wherein said mowing beam pivotally mounted on said trailing beam is tensioned with same over said first spring, the latter constituting a tension spring which equalizes partly the mowing beam weight.
3. The mowing machine, as set forth in claim 17, wherein said tensioning means comprises a cable,
a holder adjustably disposed on said main frame,
said mowing beam is operatively connected with said main frame over said second spring, the latter constituting a tension spring, as well as over said cable, and
said cable and said second spring engage said holder.
4. The mowing machine, as set forth in claim 3, wherein said holder for said cable and said second spring, respectively, comprises a tipping lever.
5. The mowing machine, as set forth in claim 4, wherein said main frame includes a bearing support,
said tipping lever is disposed on said bearing support, and
said lever has one end which said second spring engages and another end on which said cable engages.
6. The mowing machine, as set forth in claim 1, wherein said mowing beam includes an inner support, a first bracket carried by said mowing beam in the region of said inner support, and said first spring and said second spring, and said tensioning means, respectively, at least operatively engage said first bracket.

7. The mowing machine, as set forth in claim 6, further comprising a second bracket carried by said trailing beam, a link connected to said first bracket, a lever disposed on said second bracket, and said second spring on the one hand and said link on the other hand grip said lever 8. The mowing machine, as set forth in claim 1, further comprising an abutment means connected between said main frame and said trailing beam, and said abutment means limiting the swinging movement of said trailing beam relative to said main frame.